United States Patent [19]

Yoshida

[11] Patent Number: 5,784,179
[45] Date of Patent: Jul. 21, 1998

[54] IMAGE FORMING APPARATUS FOR SELECTING STACKING MEANS FOR STACKING SHEET FORMED WITH INPUT IMAGE IN ACCORDANCE WITH ATTRIBUTE OF INPUT IMAGE

[75] Inventor: Takehiro Yoshida, Tokyo, Japan

[73] Assignee: Canon Kabushiki Kaisha, Tokyo, Japan

[21] Appl. No.: 647,728

[22] Filed: May 15, 1996

[30] Foreign Application Priority Data

May 16, 1995 [JP] Japan ................. 7-141195

[51] Int. Cl.$^6$ ................. H04N 1/04; B65H 5/22
[52] U.S. Cl. ................. 358/498; 358/296; 271/3.13; 271/294
[58] Field of Search ................. 358/400, 498, 358/497, 496, 296; 271/290, 294, 296, 298, 302, 3.13, 3.01, 3.04, 3.11

[56] References Cited

U.S. PATENT DOCUMENTS

| | | | |
|---|---|---|---|
| 5,238,169 | 8/1993 | Mandel | 271/290 |
| 5,390,910 | 2/1995 | Mandel | 271/296 |
| 5,436,544 | 7/1995 | Mandel | 271/298 |
| 5,449,157 | 9/1995 | Kawano et al. | 270/53 |
| 5,551,686 | 9/1996 | Sanchez et al. | 271/298 |

*Primary Examiner*—Edward L. Coles
*Assistant Examiner*—Madeleine A.V. Nguyen
*Attorney, Agent, or Firm*—Fitzpatrick, Cella, Harper & Scinto

[57] ABSTRACT

A facsimile apparatus includes an image forming unit for forming a received image onto a sheet, a judging unit for judging an attribute of the received image, a plurality of bins each for stacking the sheet on which the image was formed by the image forming unit, a selecting unit for selecting the bin in which the sheet formed with the input image should be stacked, a plurality of sheet detecting units provided for the plurality of bins, and a display unit for displaying first information indicative of the bin, second information indicative of the attribute, and third information indicative of a detection result of the sheet detecting unit.

14 Claims, 7 Drawing Sheets

|  | CALLING PARTY TELEPHONE NUMBER | CALLING PARTY ABBREVIATION | CONDITION |
|---|---|---|---|
| FIRST SORTER BIN | 03-3451-2285 | ABC OFFICE MACHINE | WITH RECORDING SHEET |
| SECOND SORTER BIN | 03-3112-1234 | XYZ TRADING | TAKING OUT RECORDING SHEET |
| THIRD SORTER BIN | 048-211-2253 | CAB PRECISION MACHINE | WITH RECORDING SHEET |
| FOURTH SORTER BIN | 03-356-6623 | xxx ELECTRIC | WITH RECORDING SHEET |
| FIFTH SORTER BIN | 03-3483-3311 | x○ SALES | WITH RECORDING SHEET |
| SIXTH SORTER BIN |  |  | CONFIRM RECORDING SHEET |
| SEVENTH SORTER BIN |  |  |  |
| EIGHTH SORTER BIN |  |  |  |
| NINTH SORTER BIN |  |  |  |
| TENTH SORTER BIN |  |  |  |

IMAGE FORMING APPARATUS FOR SELECTING STACKING MEANS FOR STACKING SHEET FORMED WITH INPUT IMAGE IN ACCORDANCE WITH ATTRIBUTE OF INPUT IMAGE

BACKGROUND OF THE INVENTION

1. Field of the Invention

The invention relates to an image forming apparatus for selecting stacking means for stacking a sheet on which an input image is formed in accordance with an attribute of the input image.

2. Related Background Art

In a facsimile apparatus with a sorter having a plurality of bins, the bin to eject a received recording sheet is determined by the telephone number information or the like on the transmitter side or the bin is decided by the information of a receiving party designated on the transmitter side or the bin to eject the sheet is changed every communication.

In the facsimile apparatus as mentioned above, in the case where the operator tries to take out a specific recording sheet ejected in the sorter, the sheet is taken out from the specific bin determined as mentioned above. However, there is a case where the operator cannot easily judge in which bin the desired recording sheet exists, so that there is a drawback such that a use efficiency is bad.

According to a method whereby the recording sheet is once taken out and a transmitter or a receiving party is confirmed by seeing the surface or the like of the recording sheet, when it is judged that the recording sheet which was taken out is not a desired recording sheet, the sheet has to be again returned to the original bin. However, there is a drawback such that when the recording sheet is returned to the original bin, it is inserted into another bin and another operator will be troubled or the like.

SUMMARY OF THE INVENTION

It is an object of the invention to provide an image forming apparatus which can solve the foregoing drawbacks.

Another object of the invention is to provide an image forming apparatus which can easily search and take out a desired recording sheet stacked in any one of a plurality of stacking means.

Still another object of the invention is to provide an image forming apparatus in which the operator can know that the operator is going to take out a recording sheet from wrong stacking means before the recording sheet is perfectly taken out.

The above and other objects and features of the present invention will become apparent from the following detailed description and the appended claims with reference to the accompanying drawings.

DETAILED DESCRIPTION OF THE PREFERRED EMBODIMENTS

Figure 1:
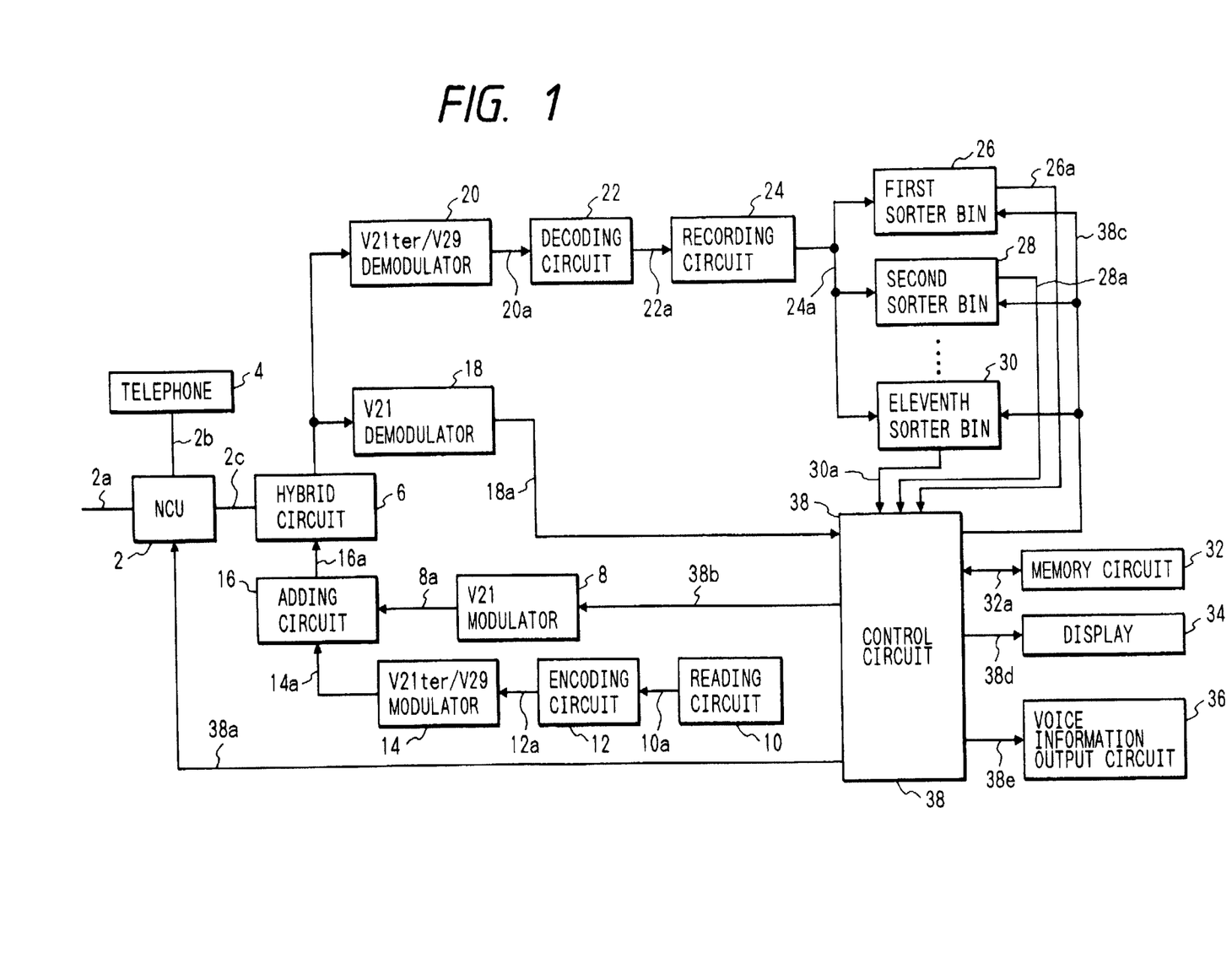
FIG. 1 is a block diagram showing an embodiment of the invention.

FIG. 1 is a block diagram showing the first embodiment of the invention.

In order to use a telephone network for a data communication or the like, an NCU (network control unit) 2 connects the telephone network to a terminal of a telephone line and performs a connection control of a telephone exchange network, a switching to a data communication path, and a holding of a loop. When a signal level (signal line 38a) from a control circuit 38 is at the "0" level, the NCU 2 connects a telephone line 2a to a telephone 4 side. When the signal level is at the "1" level, the NCU 2 connects the telephone line 2a to a facsimile apparatus side (2c side). In the ordinary state, the telephone line 2a is connected to the telephone 4 side.

A hybrid circuit 6 separates a signal of the transmitting system and a signal of the receiving system, transmits a transmission signal from an adding circuit 16 to the telephone line 2a via the NCU 2, receives a signal from a calling party via the NCU 2, and returns the received signal to a V27ter/V29 demodulator 20 and a V21 demodulator 18 via a signal line 6a.

A V21 modulator 8 is a modulator to execute a modulation based on the well-known ITU-T Recommendation V21. The V21 modulator 8 modulates a procedure signal (signal line 38b) from the control circuit 38 and transmits the modulated signal to the adding circuit 16 through a signal line 8a.

A reading circuit 10 sequentially reads an image signal of one line in the main scanning direction from an original that is conveyed, forms a signal train indicative of a binary value of black and white, and sends the resultant data from a signal line 10a to an encoding circuit 12. The reading circuit 10 is constructed by an image pickup device such as a CCD (charge coupled device) or the like and an optical system.

The encoding circuit 12 inputs the read data outputted to the signal line 10a, performs an encoding (MR encoding of K=8), and outputs the encoded data from a signal line 12a.

A V27ter/V29 modulator 14 inputs the encoded data from the signal line 12a, executes a modulation based on the well-known ITU-T Recommendation V27ter (differential phase modulation) or V29 (orthogonal modulation), and outputs the modulated data to the adding circuit 16 through a signal line 14a.

The adding circuit 16 adds outputs of the modulators 8 and 14. An output of the adding circuit 16 is sent to the hybrid circuit 6.

The V21 demodulator 18 executes a demodulation based on the well-known ITU-T Recommendation V21. The demodulator 18 inputs a procedure signal from the hybrid circuit 6 via the signal line 6a, executes the V21 demodulation, and sends the demodulated data to the control circuit 38 through a signal line 18a.

The V27ter/V29 demodulator 20 performs a demodulation based on the well-known ITU-T Recommendation V27ter or V29. The demodulator 20 inputs the modulated image signal from the hybrid circuit 6, executes the demodulation, and sends the demodulated data to a decoding circuit 22 through a signal line 20a.

The decoding circuit 22 inputs information outputted to the signal line 20a and outputs the decoded (MH decoding or MR decoding) to a recording circuit 24 from a signal line 22a.

The recording circuit 24 inputs the data outputted to the signal line 22a and sequentially records the image corresponding to the data onto the sheet every line.

A sorter bin 26 is a first sorter bin of a sorter having eleven bins. A sorter bin 28 is a second sorter bin. A sorter bin 30 is an eleventh sorter bin. The third to tenth sorter bins are not shown in the diagram. Reference numeral 24a conceptually shows the movement of the recording sheet from the recording circuit 24 to each sorter bin.

The operation to decide into which sorter bin the sheet on which the received image was recorded is enclosed is controlled by the control circuit 38 through a signal line 38c. Specifically speaking, when a signal at the level "1" is outputted to the signal line 38c, the recording sheet is enclosed into the first sorter bin 26. In a manner similar to the above, when signals "2", "3", "4", "5", "6", "7", "8", "9", "10", and "11" are outputted to the signal line 38c, the recording sheets are enclosed into the second, third, fourth, fifth, sixth, seventh, eighth, ninth, tenth, and eleventh sorter bins, respectively.

In the case where it is detected that the recording sheet has been enclosed in the first sorter bin 26, the signal of "2" is outputted to a signal line 26a. When it is detected that although the recording sheet exists in the first sorter bin 26, the recording sheet have been pulled out by a predetermined amount by the operator, the signal of "1" is outputted to the signal line 26a. When it is not detected that the recording sheet has been enclosed in the first sorter bin 26, the signal of the signal level "0" is outputted to the signal line 26a.

Figure 8:
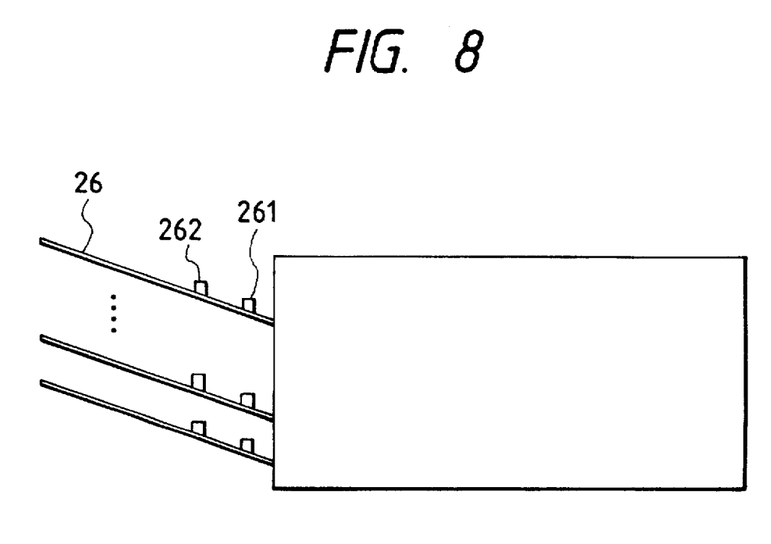
FIG. 8 is a diagram showing sorter bins and sensors.

FIG. 8 shows a construction of a detector arrangement for detecting a state in which the recording sheet have been pulled out from the sorter bin by a predetermined amount. When both of sensors 261 and 262 provided for the first sorter bin 26 detect the presence of the sheet, the sorter bin 26 generates the signal of "2" to the signal line 26a. In the case where the sensor 261 on the rear side doesn't detect the presence of the sheet and the sensor 262 on the ejecting port side detects the presence of the sheet, the sorter bin 26 generates the signal of "1" to the signal line 26a. When both of the sensors 261 and 262 don't detect the presence of the sheet, the sorter bin generates the signal of "0" to the signal line 26a.

In a manner similar to the above, when the recording sheet has been enclosed in the second sorter bin 28, the signal of the signal level "2" is outputted to a signal line 28a. In the case where although the recording sheet exists in the second sorter bin 28, the sheet have been pulled out by a predetermined amount, the signal of "1" is outputted to the signal line 28a. When no recording sheet is enclosed in the second sorter bin 28, the signal of the signal level "0" is outputted to the signal line 28a.

With respect to the other third to eleventh sorter bins as well, it is assumed that the signal is generated from each signal line, respectively.

A memory circuit 32 is a circuit to store a telephone number on the transmitter side and a user's abbreviation through a signal line 32a in correspondence to each sorter bin. The number of sorter bins lies within a range from 1 to 11 as mentioned above.

A display circuit 34 displays the telephone number on the transmitter side and the user's abbreviation in correspondence to each sorter bin and, further, can display the presence of the recording sheet or a state in which the recording sheet is being taken out.

The information to be displayed is inputted from the control circuit 38 to the display circuit 34 through a signal line 38d.

Figure 2:
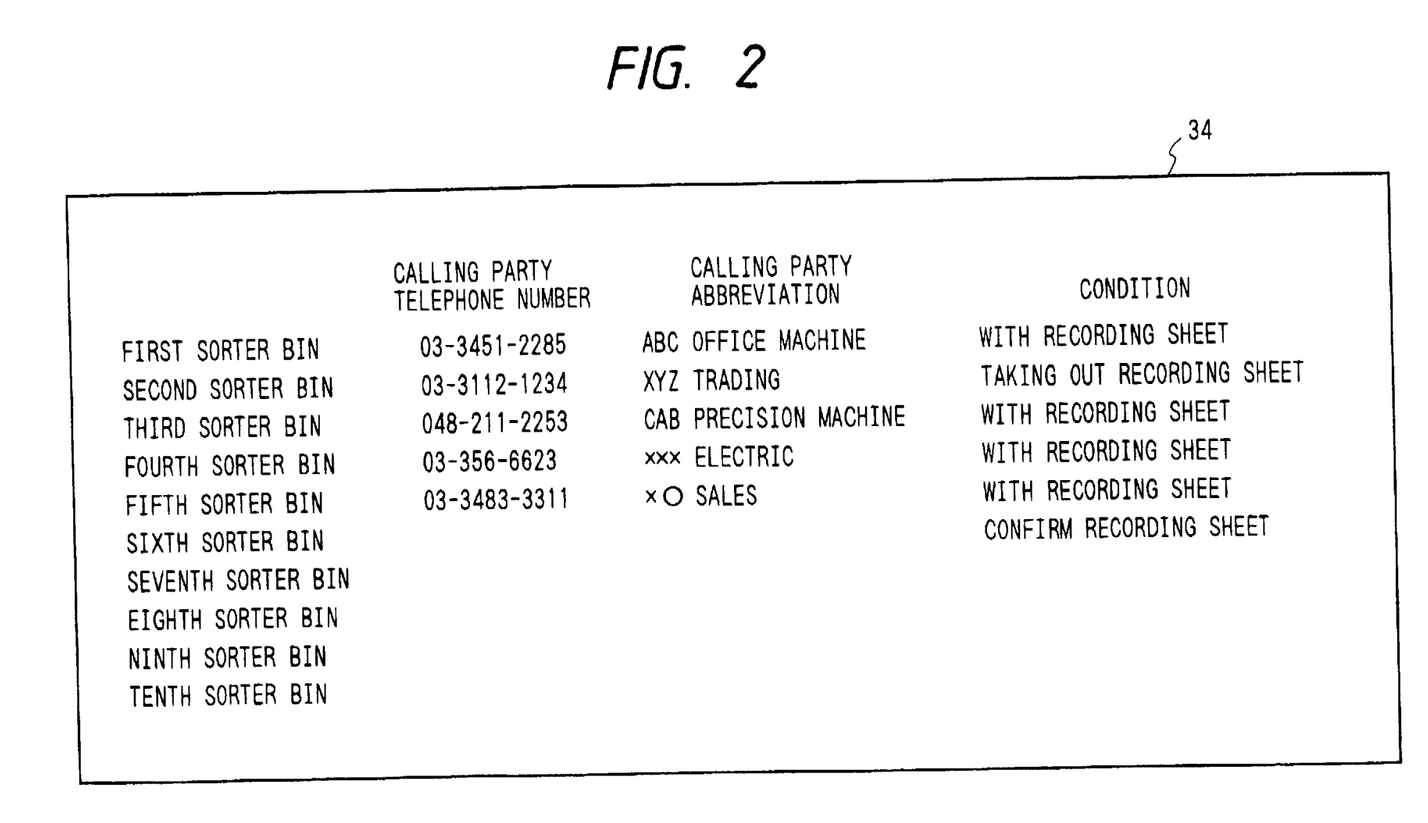
FIG. 2 is an explanatory diagram showing a display example of a display circuit of the embodiment.

FIG. 2 is a diagram showing a display example of the display circuit 34. In the display example, since the recording sheets exist in the first, third, fourth, and fifth sorter bins, "with recording sheet" is displayed in the column shown as "condition". Since the recording sheet of the second sorter bin has been pulled out from the bin by a predetermined amount, "taking out recording sheet" is displayed. A calling party telephone number and a calling party abbreviation are displayed in correspondence to the sorter bin in which "with recording sheet" or "taking out recording sheet" is displayed.

With respect to the sixth sorter bin, the recording sheet has once perfectly been taken out from the sixth sorter bin and, after the elapse of a predetermined time (for example, one minute), the recording sheet is again set to the sixth sorter bin. Therefore, "confirm recording sheet" is displayed in the column of "condition". Even if the recording sheet didn't exist in the sixth sorter bin in the past, when the recording sheet is manually inserted into the sixth sorter bin by the operator, the same message as that mentioned above is displayed. Since no recording sheet is enclosed in the seventh to tenth sorter bins, only the names of bins are displayed.

A voice information output circuit 36 inputs information of a signal line 38e. When the recording sheet was taken out from the bin by a predetermined amount, the output circuit 36 notifies the operator of the stage number of the bin from which the sheet was taken out and the information on the transmitter side by a voice. For example, a voice such that "second sorter bin 03-3112-1234, taking out recording sheet from XYZ trading" is outputted.

The control circuit 38 controls the whole facsimile apparatus of the embodiment. The control circuit 38 allows the memory circuit 32 to store the information on the transmitter side detected at the time of the facsimile reception so as to correspond to the sorter bin in which the sheet on which the received image was recorded has been enclosed. The control circuit 38 also allows the display circuit 34 to display the calling party telephone number, calling party user's abbreviation, and a message indicating that the sheet exists in the bin. After the recording sheet was ejected to the bin, when the recording sheet is pulled out from the bin by a predetermined amount, a message indicating such a fact is displayed by the display circuit 34.

The operator can confirm whether the operator is taking out the information from which calling party by observing the contents displayed by the display circuit 34. Further, when the recording sheet is removed from the bin, the display of the information on the transmitting side corresponding to the bin from which the recording sheet was removed is erased.

According to the first embodiment of the invention, the voice information output circuit 36 is not used. In FIG. 2, it is now assumed that there is no display of the sixth sorter bin.

Figure 3:
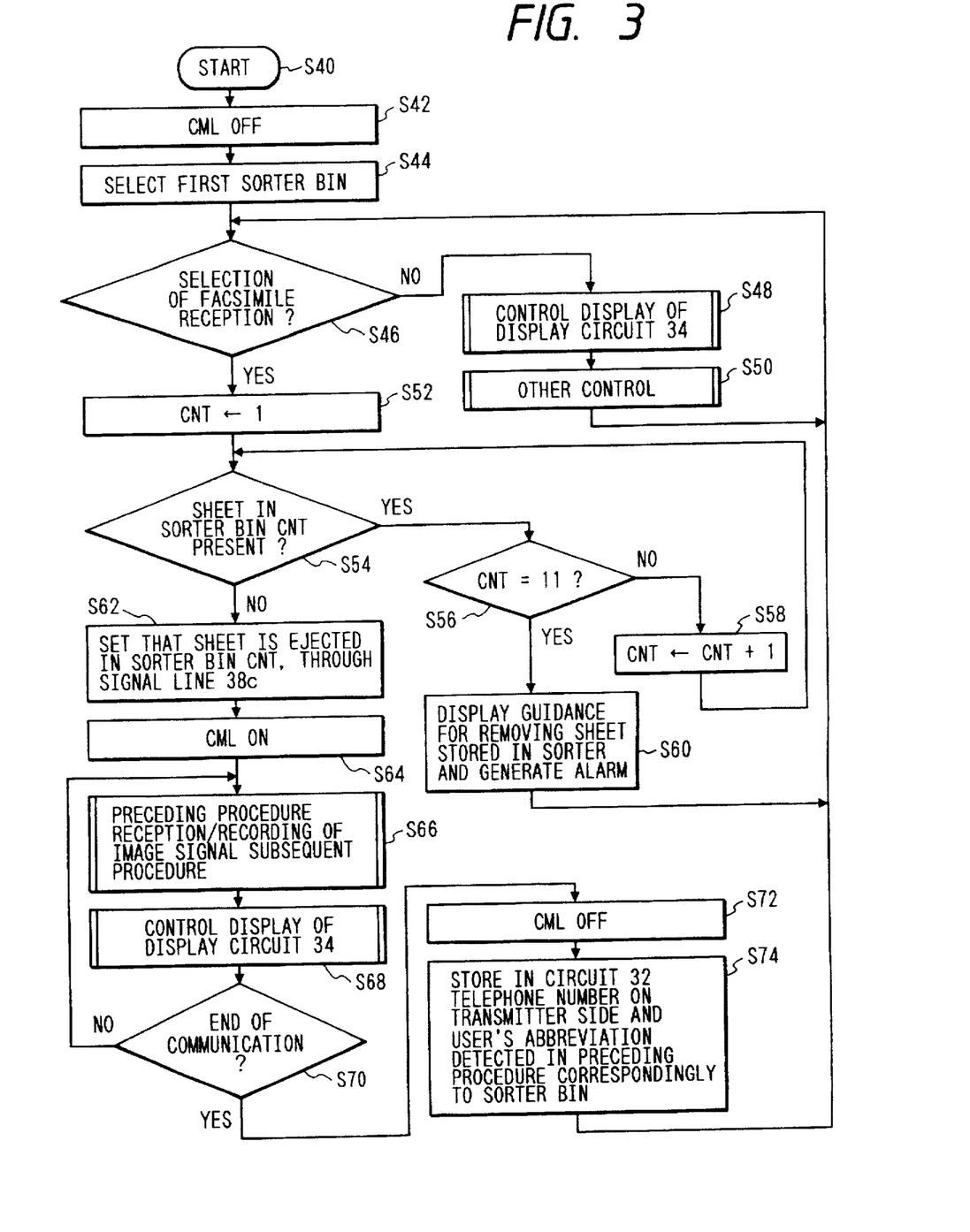
FIG. 3 is a flowchart showing the facsimile receiving operation in the first embodiment of the invention.

FIG. 3 is a flowchart showing the control operation of the control circuit 38 in the first embodiment.

In step S42, the signal of the signal level "0" is outputted to the signal line 38a and a CML is turned off. In step S44, the signal of "1" is outputted to the signal line 38c, thereby setting so as to enclose the recording sheet into the first sorter bin.

In step S46, whether the facsimile reception has been selected or not is judged. If No, step S48 follows and the display control of the display circuit 34 is performed. In step S50, the other process is executed.

When the facsimile reception is selected, step S52 follows and "1" is set into a sorter bin count CNT.

In step S54, the signals of the signal lines 26a, 28a, 30a, and the like are inputted and a check is made to see if the sheet exists in the sorter bin designated by the sorter bin count CNT. When the sheet exists, step S56 follows. If NO, step S62 follows.

In step S56, a check is made to see if the CNT is equal to 11. If YES, step S60 follows. If NO, step S58 follows.

In step S58, the value of CNT is increased by "1". In step S60, the sheets have been enclosed in all of the sorter bins, so that a guidance for instructing the operator to remove the sheets is displayed by a display unit (not shown). Further, an alarm is generated. Thus, the operator removes the sheets enclosed in the sorter bins and can effectively use the sorter.

In step S62, the value of CNT is outputted to the signal line 38c, thereby setting so as to enclose the sheet to the sorter bin CNT. In step S64, the signal of the signal level "1" is outputted to the signal line 38a and the CML is turned on. In step S66, a preceding procedure, a reception of the image signal, an ejection of the sheet on which the received image was recorded into the designated sorter bin, and a subsequent procedure are executed.

In step S68, the display control of the display circuit 34 is executed. In step S70, a check is made to see if the communication has been finished. If NO, the processing routine is returned to step S66 and the communicating operation is continued. If YES, step S72 follows and the signal of the signal level "0" is outputted to the signal line 38a and the CML is turned off.

In step S74, the telephone number on the transmitter side and the user's abbreviation which were detected by the preceding procedure are stored in the memory circuit 32 in correspondence to the sorter bin to which the sheet was ejected. In this manner, the receiving operation is finished.

Figure 4:
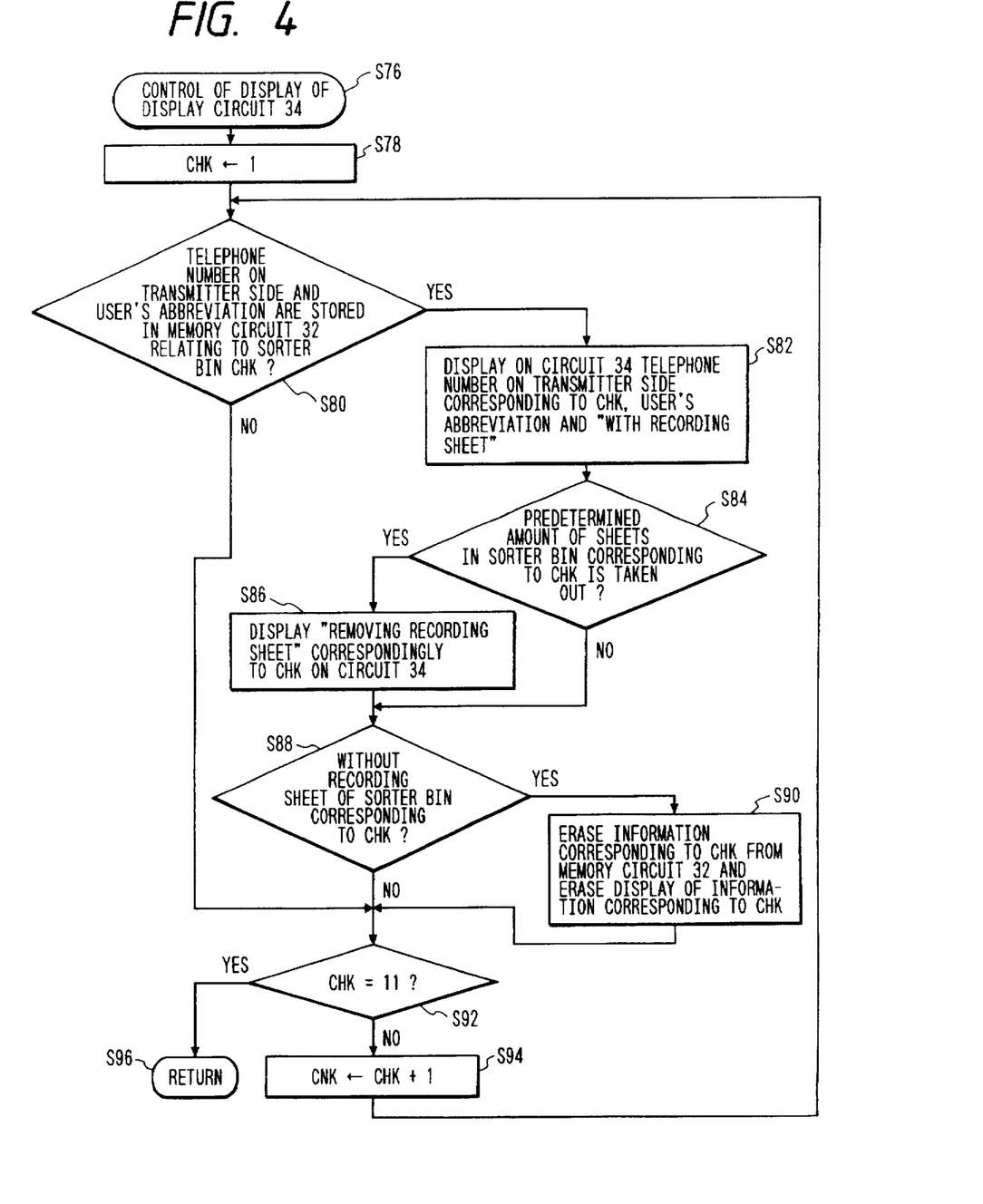
FIG. 4 is a flowchart showing the display operation in the first embodiment.

FIG. 4 is a flowchart showing a control of the display of the display circuit 34 in steps S48 and S68 mentioned above.

In step S78, "1" is set into a sorter bin check CHK. In step S80, a check is made to see if the telephone number on the transmitter side and the user's abbreviation have been stored in the memory circuit 32 with respect to the sorter bin corresponding to the sorter bin check CHK. If YES, step S82 follows. If NO, step S92 follows.

In step S82, the information in the memory circuit 32 is inputted and the telephone number on the transmitter side and the user's abbreviation are displayed in correspondence to the value set in CHK and, further, "with recording sheet" is displayed in the "condition" column by the display circuit 34.

In step S84, with respect to the sorter bin corresponding to CHK, the states of the recording sheets of the signal lines 26a, 28a, 30a, and the like are checked and a check is made to see if the recording sheet has been pulled out by a predetermined amount. If YES, step S86 follows. If NO, step S88 follows.

In step S86, in correspondence to CHK, "taking out recording sheet" is displayed in the "condition" column of the display circuit 34.

In step S88, with respect to the sorter bin CHK, the information of the signal lines 26a, 28a, 30a, and the like is inputted and the presence or absence of the recording sheet is judged. When no recording sheet exists, step S90 follows. When there is the recording sheet, step S92 follows.

In step S90, all of the display contents of the information corresponding to CHK are erased. Specifically speaking, the telephone number on the transmitter side and the user's abbreviation which were stored in the memory circuit 32 and correspond to CHK are erased. The telephone number on the transmitter side and the user's abbreviation corresponding to CHK and the display of "with recording sheet" or "taking out recording sheet" of the display circuit 32 are erased.

In step S92, a check is made to see if CHK is equal to 11. If YES, step S96 follows and the processing routine is returned from this routine. When CHK is not equal to 11, step S94 follows and the value of CHK is increased by "1" and a process similar to that mentioned above is executed with regard to the next sorter bin. Since the above display is executed, for example, in the case where although the operator tries to pull out the received recording sheet in order to take out the sheet from a "CAB precision machine", the recording sheet is pulled out from the second sorter bin which is adjacent by one bin because of an erroneous operation of the operator, contents as shown in FIG. 2 are displayed. Therefore, it is sufficient for the operator to confirm such a display. The operator is immediately aware of his own mistake and can return the sheet which was erroneously pulled out to the second bin. Particularly, in a sorter such that a distance between the sorter bins is short, since it is troublesome to insert the sheet which was once taken out into the original bin, a construction such that the operator is allowed to be aware of his mistake before the sheet will perfectly have been taken out from the bin like an embodiment is effective. Even if the operator on the receiving side doesn't confirm the destination by reading the recording contents of the recording sheet, by seeing the display of the display circuit 34 of the operation unit, the user can confirm that the recording sheet of the desired sorter bin has correctly been taken out. A use efficiency is improved.

In the above embodiment, although the control of the display of the display circuit 34 in steps S68 and S48 has been performed in a lump for the first to eleventh sorter bins, the display for only one sorter bin can be also processed at a time as a second embodiment of the invention.

In the above first embodiment, when the recording sheets exist in all of the sorter bins, the reception is not performed. However, as a third embodiment of the invention, it is also possible to construct in a manner such that when the first to tenth sorter bins are filled with the recording sheets, the sheets on which the received image was recorded are sequentially ejected to a specified sorter bin, for example, the eleventh sorter bin and a message indicating that the received recording sheets from a plurality of destinations exist in the eleventh sorter bin is displayed.

As a fourth embodiment of the invention, in the case where the recording sheet was taken out from the bin by a predetermined amount, the bin from which the sheet was taken out and the information on the transmitter side can be also notified by a voice to the user by using the voice information output circuit 36. Thus, the user can recognize which received original was taken out without seeing the operation unit and it is convenient.

Figure 5:
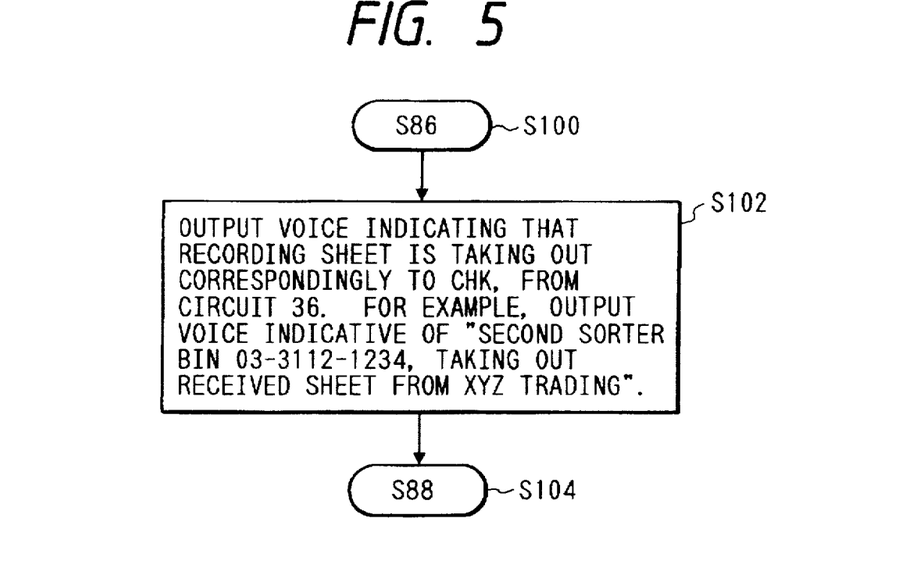
FIG. 5 is a flowchart showing the display operation in the fourth embodiment of the invention.

FIG. 5 is a flowchart showing a portion different from that of the control of FIG. 4 among the specific examples of the above control.

In FIG. 5, step S100 denotes step S86 in FIG. 4. In step S102, a message informing that the recording sheet is being taken out in correspondence to CHK is generated by a voice from the voice information output circuit 36. For example, a voice of "second sorter bin 03-3112-1234, taking out received sheet from XYZ trading" is generated. In step S104, the processing routine advances to step S88 in FIG. 4.

As a fifth embodiment of the invention, it is also possible to construct as follows. Namely, after the recording sheet was taken out from the bin, in the case where the recording sheet is again inserted into such a bin in a predetermined time (for example, one minute), the display before the recording sheet is taken out is continued. After the elapse of a predetermined time (for example, one minute) or the like, in the case where the recording sheet is again inserted into such a bin, it is judged that there is a possibility such that another recording sheet has been inserted, so that the display contents are switched (the calling party telephone number and the calling party user's abbreviation which were displayed in correspondence to the bin are erased and a message to instruct the operator to confirm the recording sheet of the bin is displayed in the "condition" column).

Figure 6:
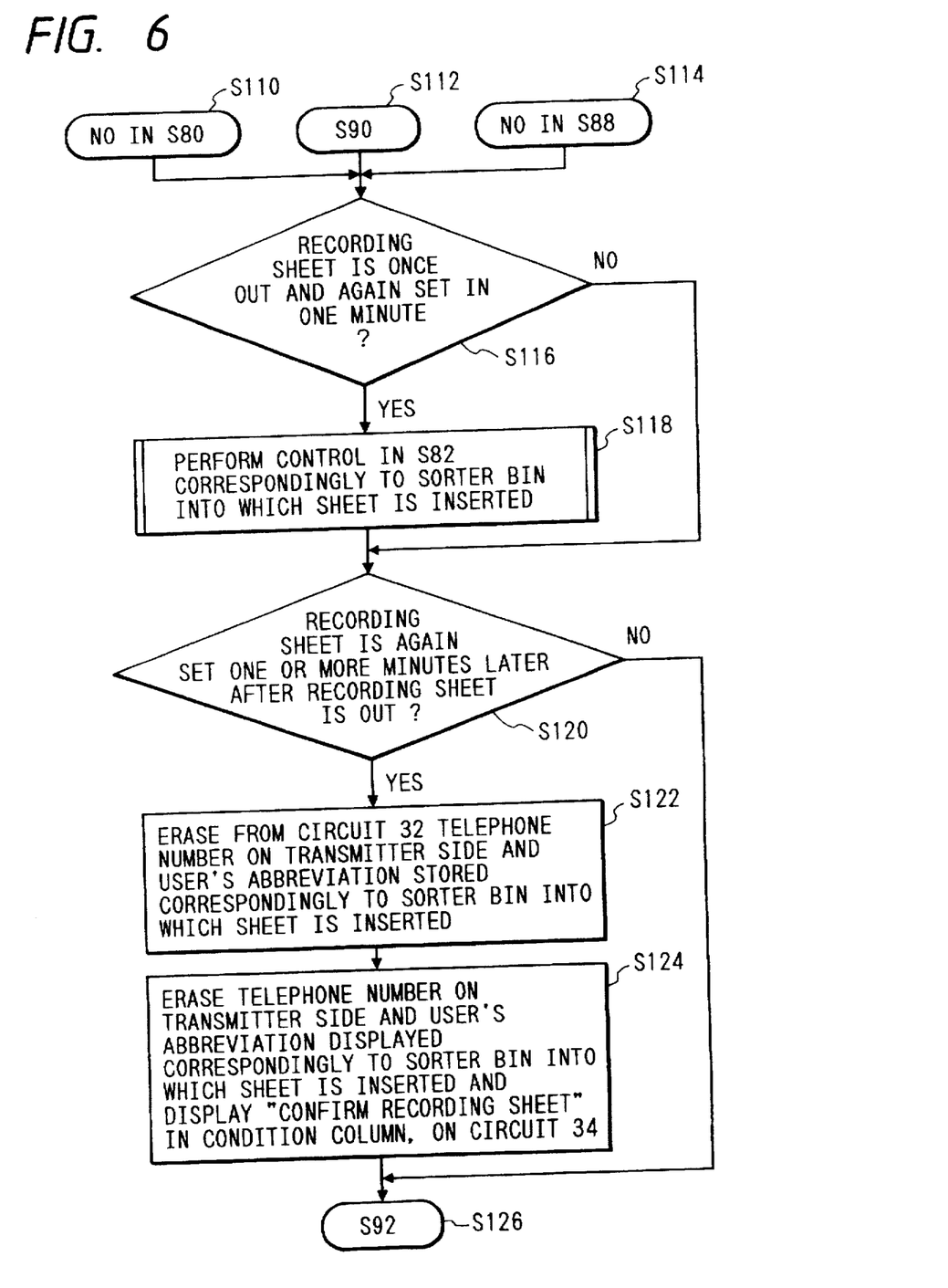
FIG. 6 is a flowchart showing the display operation in the fifth embodiment of the invention.

FIG. 6 is a flowchart showing portions different from the control of FIG. 4 among the specific examples of the above control.

In FIG. 6, steps S110, S112, and S114 denote the case of NO in step S80 and the cases of NO in steps S90 and S88 in FIG. 4, respectively. In step S116, a check is made to see if after the recording sheet once disappeared from the bin, the recording sheet has been again inserted into such a bin in one minute. If YES, step S118 follows and the control in step S82 in FIG. 4 is executed in correspondence to the sorter bin in which the sheet was inserted. Namely, the same display as that before the recording sheet is taken out is continued. If NO, step S120 follows.

In step S120, a check is made to see if after the recording sheet once disappeared from the bin, the sheet has been again inserted into such a bin after the elapse of one minute or more. When the recording sheet is inserted to the bin after the elapse of one minute or more, step S122 follows. If NO, step S126 follows.

In step S122, the telephone number on the transmitting side and the user's abbreviation which were stored are erased from the memory circuit 32 in correspondence to the sorter bin in which the sheet was inserted.

In step S124, the telephone number on the transmitting side and the user's abbreviation which were displayed are erased in correspondence to the sorter bin in which the sheet was inserted and "confirm recording sheet" is displayed in the "condition" column by the display circuit 34. In step S126, the processing routine advances to step S92 in FIG. 4.

As a sixth embodiment of the invention, in the construction as mentioned above, a display unit to display the calling party telephone number and the calling party user's abbreviation is provided at the position of the ejecting port of each bin. When the recording sheet outputted to each bin is taken out, the calling party telephone number and the calling party user's abbreviation which were displayed in the display unit at the position of the ejecting port of the bin can be also erased.

By the above control, by seeing the ejecting port of the sorter bin, since the operator can know the information on the transmitting side regarding the recording sheet to be taken out right now, the sheet can be correctly taken out.

The above control can be realized by constructing in a manner such that the display information of the display circuit 34 is displayed by the display unit of the first, second, . . . . and eleventh sorter bins 26, 28, . . . . and 30 in correspondence to the sorter bins, respectively.

As a seventh embodiment of the invention, in each of the above embodiments, information of a receiving party designated by the transmitter side can be also handled in place of the information on the transmitter side.

Specifically speaking, in the memory circuit 32, display circuit 34, and voice information output circuit 36 shown in FIG. 1 and the flowcharts of FIGS. 2 to 6, it is sufficient to handle the receiving party designated by the transmitter side in place of the telephone number on the transmitter side and the user's abbreviation.

As an eighth embodiment of the invention, it is also possible to construct in a manner such that the information of the receiving party designated on the transmitter side is stored in correspondence to the sorter bin and there is the sheet which has already been ejected to the bin and, when the information to the same receiving party as that mentioned above is designated on the transmitter side, the received sheet is ejected to the same bin.

As a specific example, for the seventh embodiment, in the case where the receiving party is designated in the preceding procedure, if the received sheet to the same receiving party has already been ejected to the sorter bin, it is sufficient to set so as to eject the received sheet to the sorter bin. A message indicating that there are the received sheets from a plurality of destinations can be also displayed.

Further, as a ninth embodiment of the invention, in the above facsimile apparatus, selecting means for selecting a mode to display the information on the transmitter side or a mode to display the information of the receiving party that is designated on the transmitter side is provided and the information to be displayed can be also determined by the information of the selecting means.

Figure 7:
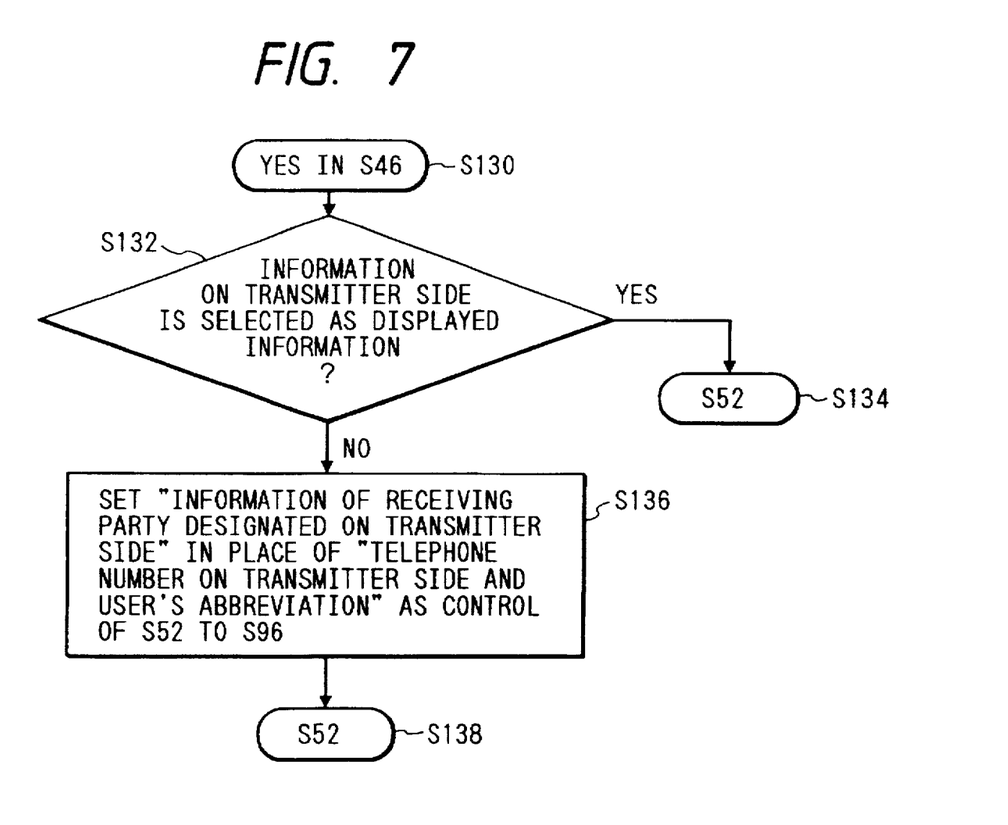
FIG. 7 is a flowchart showing the facsimile receiving operation in the ninth embodiment of the invention.

FIG. 7 is a flowchart showing portions different from those in the control of FIG. 3 among the specific examples of the above control.

In FIG. 7, step S130 corresponds to YES in step S46 in FIG. 3. In step S132, a state of selecting means (not shown) is checked. A check is made to see if the information to be displayed is the information on the transmitter side. In case of the information on the transmitter side, step S134 (S52 in FIG. 3) follows. In case of the information of the receiving party which is designated on the transmitter side, step S136 follows.

In step S136, the subsequent control is executed and in all of steps S52 to S96, a message of "information of receiving party designated on transmitter side" is displayed in place of "telephone number on transmitter side and user's abbreviation". In step S138, the processing routine advances to step S52 in FIG. 3.

What is claimed is:

1. An image forming apparatus comprising:

image forming means for forming an input image onto a sheet;

a plurality of stacking means for receiving one or more sheets, including the sheet on which the input image was formed by said image forming means;

a sheet detector arrangement which detects if any sheet is pulled out a predetermined amount from any of said plurality of stacking means, wherein the predetermined amount is less than complete removal of the sheet from said stacking means; and display means for displaying an attribute of the sheet pulled out the predetermined amount in response to a detection result provided by said sheet detector arrangement.

2. An apparatus according to claim 1, wherein said sheet detector arrangement includes, for each said stacking means, two sensors for detecting that the sheet has been pulled out in a sheet taking-out direction, and said sheet detector arrangement generates a first-status signal when said two sensors detect the sheet, generates a second-status signal when one of said two sensors detects the sheet and the other of said two sensors does not detect the sheet, and generates a third-status signal when both of said two sensors do not detect the sheet, said second-status signal indicating that the sheet has been pulled out the predetermined amount.

3. An apparatus according to claim 2, wherein, when said sheet detector arrangement generates said first-status signal, said display means displays information indicative of the presence of the sheet in said stacking means.

4. An apparatus according to claim 1, wherein said attribute indicates a generation source of said input image.

5. An apparatus according to claim 1, wherein said attribute indicates an intended recipient of the sheet on which the input image was formed.

6. An apparatus according to claim 1, wherein said plurality of stacking means are a plurality of trays arranged in the vertical direction.

7. An apparatus according to claim 1, wherein said image forming means forms an image on the basis of image data which was facsimile received.

8. A method of displaying a stacking state of a sheet in an image forming apparatus having image forming means for forming an input image onto the sheet and a plurality of stacking means for stacking the sheet on which the input image was formed by said image forming means, comprising the steps of:

determining whether the sheet has been stacked in any of said stacking means or not;

detecting whether the sheet has been pulled out a predetermined amount from said stacking means, where the predetermined amount is less than complete removal of the sheet from said stacking means; and displaying an attribute, of the sheet pulled out the predetermined amount in response to a detection result in said detecting step.

9. A method according to claim 8, wherein said detecting step uses two sensors for detecting that the sheet has been pulled out in a sheet taking-out direction, and a first-status signal is generated when said two sensors detect the sheet, a second-status signal is generated when one of said two sensors detects the sheet and the other sensor does not detect the sheet, and a third-status signal is generated when both of said two sensors do not detect the sheet, said second-status signal indicating that the sheet has been pulled out the predetermined amount.

10. A method according to claim 9, wherein when said second-status signal is generated, said displaying step displays information indicative of the presence of the sheet, and when said third-status signal is generated, said displaying step displays information indicating that the sheet has been removed.

11. A method according to claim 8, wherein said attribute indicates a generation source of said input image.

12. A method according to claim 8, wherein said attribute indicates an intended recipient of the sheet on which said input image was formed.

13. A method according to claim 8, wherein said plurality of stacking means are a plurality of trays arranged in a vertical direction.

14. An apparatus according to claim 8, wherein said image forming means forms an image on the basis of image data which was facsimile received.

* * * * *

UNITED STATES PATENT AND TRADEMARK OFFICE
CERTIFICATE OF CORRECTION

PATENT NO. : 5,784,179

DATED : July 21, 1998

INVENTOR(S) : TAKEHIRO YOSHIDA

Page 1 of 2

It is certified that error appears in the above-identified patent and that said Letters Patent is hereby corrected as shown below:

ON COVER PAGE AT [56], REFERENCES CITED, U.S. PATENT DOCUMENTS

"5,238,169 8/1993 Mandel" should read
--5,328,169 7/1994 Mandel--;

"5,436,544" should read --5,435,544--.

COLUMN 3

Line 29, "sheet" should read --sheets--;
Line 35, "have" should read --has--;
Line 40, "doesn't" should read --does not--;
Line 44, "don't" should read --do not--;
Line 51, "sheet exists" should read --sheets exist--.

COLUMN 4

Line 21, "didn't" should read --did not--.

UNITED STATES PATENT AND TRADEMARK OFFICE
CERTIFICATE OF CORRECTION

PATENT NO. : 5,784,179

DATED : July 21, 1998

INVENTOR(S) : TAKEHIRO YOSHIDA

It is certified that error appears in the above-identified patent and that said Letters Patent is hereby corrected as shown below:

COLUMN 6

Line 25, "his" should read --their--;
Line 30, "his" should read --their--;
Line 33, "doesn't" should read --does not--.

Signed and Sealed this

Eighteenth Day of May, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT : 5,784,179

DATED : July 21, 1998

INVENTOR(S) : TAKEHIRO YOSHIDA

It is certified that error appears in the above-identified patent and that said Letters Patent is hereby corrected as shown below:

<u>COLUMN 3</u>

Line 52, "sheet" should read -- sheets --.

Signed and Sealed this

First Day of June, 1999

*Attest:*

Q. TODD DICKINSON

*Attesting Officer*  *Acting Commissioner of Patents and Trademarks*